United States Patent Office 2,739,647
Patented Mar. 27, 1956

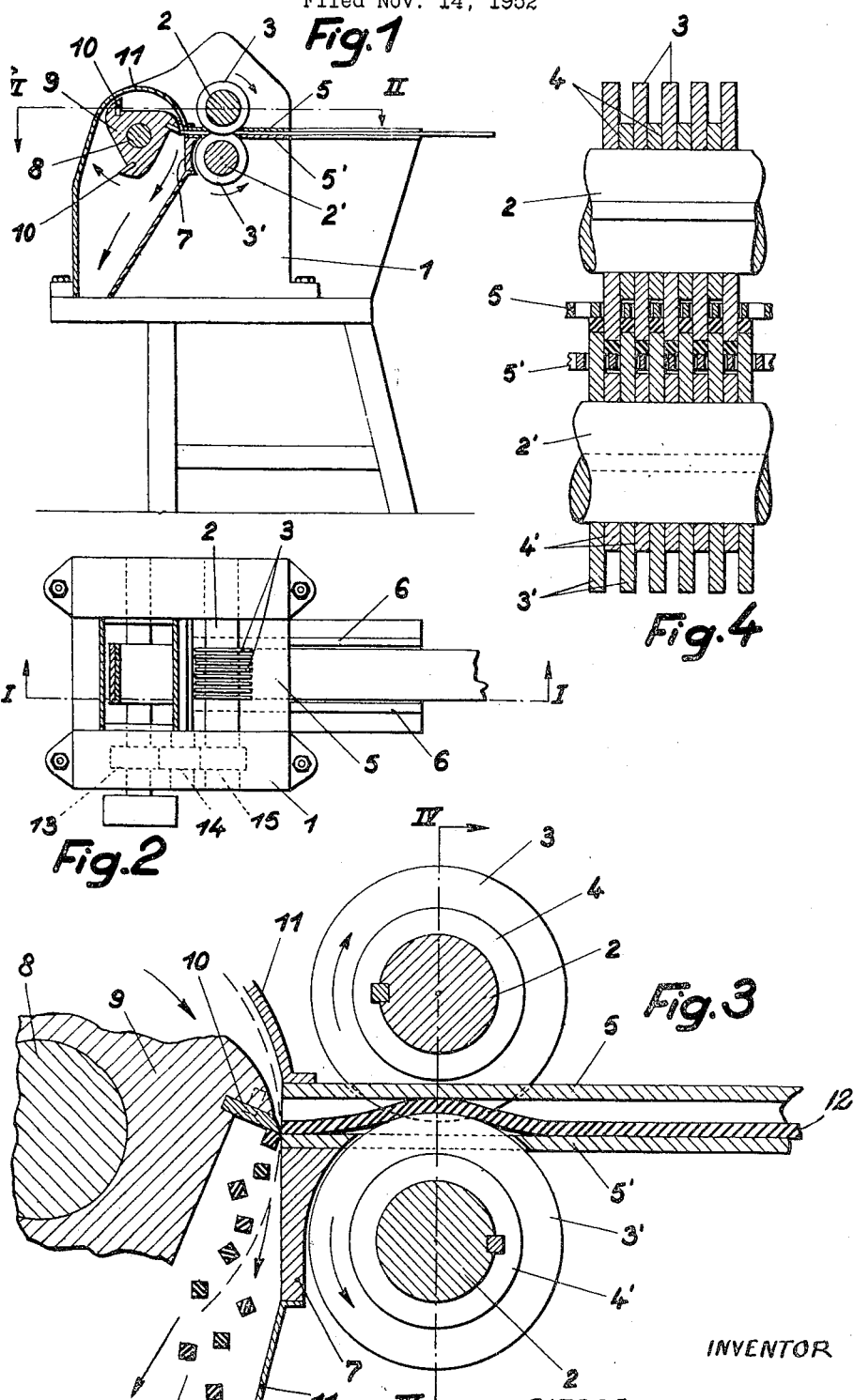

2,739,647

MACHINE FOR THE PRODUCTION OF GRANULAR MATERIAL, MORE PARTICULARLY FOR INJECTION MOULDING MACHINES

Pierre Paul Henri Coste, Lyon, France

Application November 14, 1952, Serial No. 320,407

Claims priority, application Great Britain November 17, 1951

2 Claims. (Cl. 164—61)

It is known that in such machines the thermoplastic substance is introduced into the injection cylinder in the form of a powder, or of a granular material of relatively fine granulation. With substances of a relatively hard or rigid character, this pulverulent or granular material is easily obtained by crushing, milling etc., but with relatively flexible substances the production of such a pulverulent or granular material becomes difficult. Such is the case for instance with vinyl chloride compounds which are generally supplied in the form of flexible sheets.

The present invention has for its object a machine by means of which such a sheet may be rapidly cut into very small pieces and thus transformed into a granular mass suitable for injection moulding machines.

The machine according to the invention comprises circular rotating cutters adapted to cut longitudinally a band of material into a number of strips, and rotating blades adapted to cut transversely the said strips as they come from the circular rotating cutters.

The circular rotating cutters are preferably in the form of discs carried by two parallel shafts, the thickness of each disc being substantially equal to the width of the space between two successive discs and the discs carried by one shaft engaging the spaces between the discs of the other shaft. The band to be cut is led to the discs between two flat parallel guides which are slotted for the passage of the discs.

The rotating blades may be carried by a rotor disposed transversely with respect to the strips issuing from the rotating cutters.

The guides for the band extend sufficiently beyond the discs to form a support for the strips as they are cut by the rotating blades.

In the annexed drawings:

Fig. 1 is a sectional elevation of a machine according to the invention.

Fig. 2 is a horizontal section thereof taken along line II—II of Fig. 1. The line corresponding to the vertical section of Fig. 1 is indicated at I—I in this Fig. 2.

Fig. 3 shows to an enlarged scale a portion of Fig. 1.

Fig. 4 is a section taken along line IV—IV of Fig. 3.

Referring to Figs. 1 and 2, reference numeral 1 designates the frame of the machine, 2 and 2' are two horizontal shafts parallel to each other and disposed one above the other. Each shaft 2 or 2' carries a plurality of discs, respectively 3 and 3' (Figs. 3 and 4), separated from each other by washers 4 and 4' the thickness of the said washers being substantially equal to the thickness of the discs. The diameter of the discs and their arrangement on their respective shafts are such that the discs carried by one shaft engage the intermediate spaces separating the successive discs carried by the other shaft.

Two plates 5, 5' are disposed horizontally one above the other so as to form a horizontal intermediate space situated at equal distance from each of the shafts 2 and 2'. Each plate 5 or 5' is slotted for the passage of the discs 3 or 3' of the corresponding shaft 2 or 2', as clearly shown in Fig. 4. Lateral rules 6 (Fig. 2) are disposed in the space comprised between plates 5 and 5' on each side of discs 3, 3' and in a transverse direction with respect to shafts 2, 2'. As shown in Fig. 3 plates 5 and 5' terminate at one end at a small distance from discs 3, 3' and they are supported by a support 7.

Adjacent the support 7 there is disposed a transverse shaft 8 which carries a rotor 9 formed with three projections in the form of teeth, each carrying a transverse blade 10 the cutting edge of which is arranged to pass close to support 7, as shown in Fig. 3. Rotor 9 is enclosed within a casing 11 which opens downwardly.

Shafts 2 and 2' are adapted to rotate in opposed direction and in such a manner as to tend to push towards rotor 9 a band 12 of material caught between the discs 3 and 3'. They are driven from shaft 8 through gears 13, 14 and 15 (Fig. 2).

The flexible sheet to be reduced into granular form is first cut into a number of bands by any approximate means and each band is introduced into the guide formed by plates 5, 5' and rules 6. When the band reaches the cutting discs 3, 3', it is cut longitudinally into a number of strips of small width, as indicated in Fig. 4, and these strips are pushed towards rotor 9 into casing 11 where they are cut into small pieces by blades 10. The comminuted material falls towards the bottom of casing 11 where it is collected. The machine operates very rapidly and with discs 3, 3' of reduced thickness and a high speed of rotor 9 it may produce very fine grains.

It will be appreciated that the number of blades of rotor 9 may vary and that the construction of the rotating cutters may be modified. For instance shaft 2' could carry a plain drum while shaft 2 would carry a plurality of thin and sharp circular blades adapted to cut the band on the drum.

Having thus described my invention, what I claim is:

1. A machine for producing granular material from flexible sheets of thermoplastic substances comprising two intermeshing sets of circular cutters with substantially parallel transverse shafts adapted to move the sheet and to cut same into a plurality of strips; means to rotate said cutters in unison; a pair of spaced parallel plates perpendicular to the common plane of the axes of said sets of circular cutters and extending continuously in a longitudinal direction on each side of said plane for receiving and guiding said sheet and said strips therebetween, each of said plates being spaced from the circular cutters of one of said sets and being slotted to permit the circular cutters of the other one of said sets to project into the space between said plates; a rotatable blade holder disposed at the outlet end of said plates in parallel relation to said circular cutters; blades mounted on said holder with their cutting edge coacting with the outlet end of one of said plates to cut said strips into small pieces; and means to rotate said blade holder.

2. A machine for producing granular material from flexible sheets of thermoplastic substances comprising two intermeshing sets of circular cutters with substantially transverse shafts adapted to move the sheet and to cut same into a plurality of strips, means for rotating said cutters in unison, a pair of spaced parallel plates perpendicular to the common plane of the axes of said sets of circular cutters and extending continuously in a longitudinal direction on each side of said plane for receiving and guiding said sheet and said strips therebetween, each of said plates being spaced from the circular cutters of one of said sets and being slotted to permit the circular cutters of the other one of said sets to project into the space between said plates, a pair of parallel bars longitudinally disposed between said plates to guide the side edges of said strips, a rotatable blade holder disposed at the outlet end of said plates in parallel relation to said circular cutters, blades being mounted on said holder with their cutting edge coacting with the outlet end of one of said plates for cutting said strips into small pieces and means for rotating said blade holder.

References Cited in the file of this patent

UNITED STATES PATENTS

| Number | Name | Date |
|---|---|---|
| 303,893 | Stewart | Aug. 19, 1884 |
| 712,187 | Frazer | Oct. 28, 1902 |
| 1,878,453 | Lade | Sept. 20, 1932 |
| 1,939,246 | Antonsen | Dec. 12, 1933 |
| 1,978,826 | Walton | Oct. 30, 1934 |
| 2,242,887 | Holdgate et al. | May 20, 1941 |
| 2,297,368 | Rippl | Sept. 29, 1942 |
| 2,335,515 | Jehle | Nov. 30, 1943 |
| 2,465,670 | Urschel et al. | Mar. 29, 1949 |
| 2,570,466 | MacHenry | Oct. 9, 1951 |
| 2,603,262 | Urschel | July 15, 1952 |

FOREIGN PATENTS

| Number | Country | Date |
|---|---|---|
| 644,032 | Great Britain | Oct. 4, 1950 |